United States Patent [19]
Hok-Yin

[11] Patent Number: 5,778,939
[45] Date of Patent: Jul. 14, 1998

[54] FLEXIBLE PLASTICS VACUUM CLEANER CORE

[75] Inventor: Timmy Sin Hok-Yin, Kowloon, Hong Kong

[73] Assignee: Dual Voltage Co. Ltd., Kowloon, Hong Kong

[21] Appl. No.: 603,438

[22] Filed: Feb. 20, 1996

[30] Foreign Application Priority Data

Feb. 8, 1996 [GB] United Kingdom ............... 9602580

[51] Int. Cl.⁶ .................................................. F16L 11/00
[52] U.S. Cl. ................. 138/120; 138/155; 138/110; 138/109; 285/166; 285/264
[58] Field of Search ........................... 138/120, 110, 138/155, 109; 285/166, 184, 264, 261

[56] References Cited

U.S. PATENT DOCUMENTS

| | | | |
|---|---|---|---|
| 203,611 | 5/1878 | Graydon | 285/166 |
| 205,069 | 6/1878 | Farnsworth | 285/166 |
| 1,040,191 | 10/1912 | Hale | 285/166 |
| 1,451,800 | 4/1923 | Agner | 138/120 |
| 1,500,921 | 7/1924 | Bramson et al. | 285/166 |
| 3,695,646 | 10/1972 | Mommsen | 285/166 X |
| 3,910,277 | 10/1975 | Zimmer | 138/120 X |
| 4,648,733 | 3/1987 | Merkt | 138/120 X |
| 5,134,251 | 7/1992 | Martin | 138/110 X |
| 5,143,123 | 9/1992 | Richards et al. | 138/110 X |
| 5,215,338 | 6/1993 | Kimura et al. | 138/120 X |
| 5,353,843 | 10/1994 | Hoag | 138/110 |
| 5,449,206 | 9/1995 | Lockwood | 138/120 X |

*Primary Examiner*—Patrick F. Brinson
*Attorney, Agent, or Firm*—Leydig, Voit & Mayer, Ltd.

[57] ABSTRACT

A flexible self-supporting plastic core 10 has an outer protective hose 12. The core is made up of a number of back-to-back male members 13 and back-to-back female members 14 and has two end connectors 15 and 16. The members 13 and 14 fit end to end to form fluid-tight ball and socket universally rotatable joints therebetween.

9 Claims, 2 Drawing Sheets

FLEXIBLE PLASTICS VACUUM CLEANER CORE

BACKGROUND OF THE INVENTION

1. Field of the Invention

The invention relates to plastic flexible cores.

2. Description of Prior Art

The invention relates more particularly to plastics flexible core comprising a plurality of separately formed members that fit together to make up desired lengths of such cores and in which the joints between the members are relatively flexible. Preferably, the joints are formed by frictionally engaging surfaces that permit relative movement between adjacently joined members where the relative orientation of the member is retained when bending stresses are removed. As such the cores are self-supporting so that the core remains in any desired shape along its length set by a user. Cores are already known where each of the members forming lengths of cores are generally identical. Each member comprises a male connector at one of its ends and a female connector at the other of its ends. While this has certain attractions in terms of simplicity of production, the arrangement leads to significant restrictions in individual design options for forming ends of two types, male and female, on each member and, in particular, reduces the ability to form cores with comparative wide and unrestricted inner passages.

SUMMARY OF THE INVENTION

It is therefore an object of the invention to overcome or reduce these restrictions.

According to the invention there is provided a flexible self-supporting plastics core comprising a plurality of first and second members resiliently inter-engaged alternatively end to end along the length of the core to form universally rotatable fluid tight joints between adjacent members, in which the first members each comprise integrally formed back-to-back generally cylindrical pairs of male members terminating adjacent each end with a part spherical outer surface, and in which the second members each comprise integrally formed back-to-back generally cylindrical hollow pairs of female members terminating adjacent each end with a part spherical inner surface, the members being adapted to snap-fit together with the part spherical outer surfaces engaged inside respective part spherical inner surfaces.

A minimum internal diameter of the first and second members is preferably substantially the same, and at least 50% of a maximum diameter of the core.

A flexible hose may surround and extend along the length of the core.

A connector may be provided comprising a length of uniform cylindrical tube integrally formed at one end with a female member that snap-fits to an end male member of the flexible core.

The diameter of the uniform cylindrical tube is preferably tapered adjacent a remote end away from the female member.

The connectors may comprise male or female connectors arranged to fit respectively to female or male connectors provided on an appliance.

The flexible self-supporting flexible core may have a male connector at one end and female connector at the other end.

It has been mentioned that prior art cores have inner passages that are relatively narrow compared to their overall sizes and it should be said that in general they have undulating inner surfaces often with pockets and crevices. In some applications this may not be technically important but for applications of specific interest to the Applicant, that is providing flexible cores for vacuum cleaners, the inner passage must be ideally relatively large and unobstructed.

BRIEF DESCRIPTION OF THE DRAWINGS

The invention will now be more particularly described by way of example only with reference to the accompanying drawings in which.

DESCRIPTION OF THE PREFERRED EMBODIMENTS

Figure 1:
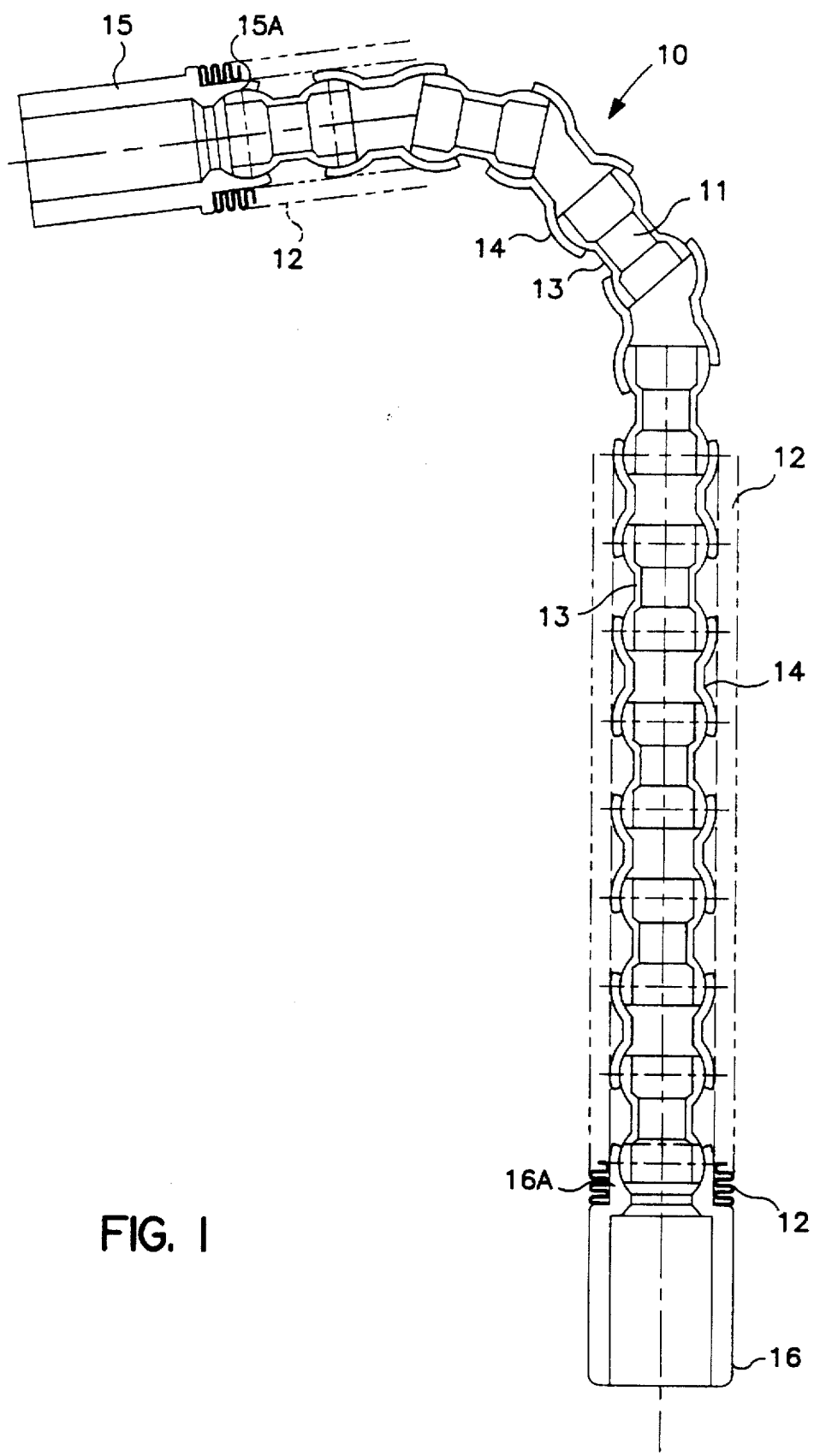
FIG. 1 is a cross-sectional side view of an embodiment of a flexible core for a vacuum cleaner in accordance with the invention.
Figure 2:
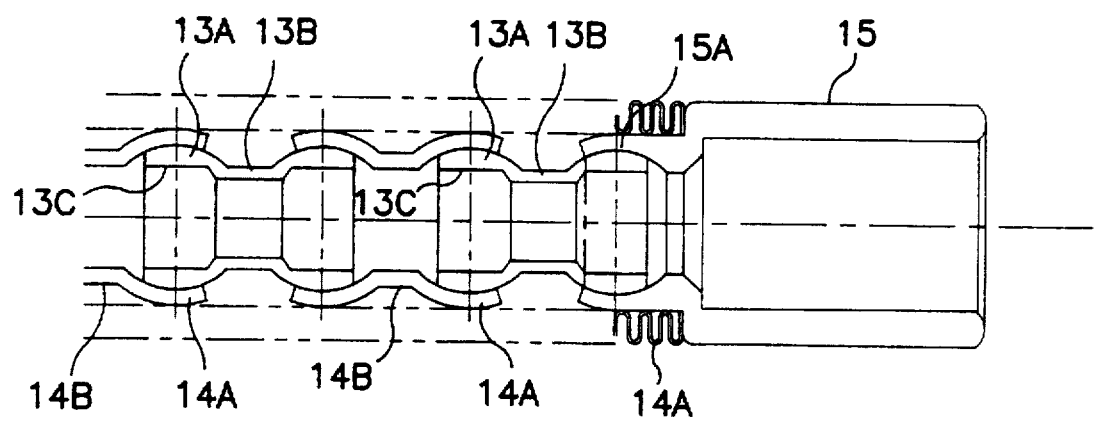
FIG. 2 is a cross-sectional side view, on an enlarged scale, of one end of the core of FIG. 1.

Referring to the drawings, there is shown a flexible core 10 for connecting between a pick-up nozzle and a body of the vacuum cleaner or the end of a suction tube attached to the cleaner. The core 10 has an inner passage 11 for fluid delivery and a protective flexible outer hose 12. The core 10 is formed by a series of tubular members 13 and 14 divided into two types connected one after another in an alternating manner to form universally rotatable fluid tight joints between adjacent members.

Each member 13, of the first type, has two identical opposite end sections 13A, forming back-to-back male members, and a middle section 13B, which are integrally formed co-axially together. Each male end section 13A has a cylindrical inner surface 13C surrounded by a part-spherical outer surface. The middle section 13B has inner and outer surfaces which are both cylindrical. The two male end sections 13A are slightly larger than the middle section 13B, resulting in a dumbbell-shape for the member 13.

Each member 14, of the second type, has two identical opposite end sections 14A, forming back-to-back female members, and a middle section 14B, which are integrally formed co-axially together. Each female end section has part-cylindrical inner and outer surfaces 14A and 14B. The middle section 14B has cylindrical inner and outer surfaces. The thickness of the walls of the member 13 are uniform throughout and the inner diameter of the section 14B is at least generally the same as the inner diameter of the sections 13A and 13B.

The connection between two adjacent members 13 and 14 is achieved by snap-fitting a female end section 14A over a male end section 13A, to form, in effect, a ball-and-socket fluid tight joint. The two members 13 and 14 are universally rotatable, and pivotable at least to a limited but practically sufficient extent, with respect to each other into a certain relative orientations. The relative positions between the various members are chosen in practice usually by manual manipulation to allow the length of the core to be formed into any desired shape. The shape is self-sustaining, that is the core is self-supporting, by reason of friction at the ball-and-socket joints.

Referring again to FIG. 1, the core 10 has a male connector 15 at one end and a female connector 16 at the other end. Each connector is formed of a generally uniform cylindrical plastics tube having respective integrally formed female section 15A and 16A, which are identical to the female sections 14A, at one end. The sections 15A and 16A snap fit to the ends of the core to make up a length of the core that, in practice, serves as part of the vacuum passage for attachment to a vacuum cleaner. One connector of the core is used to attach the core to a vacuum cleaner accessory item, such as a brush or nozzle, or the like. It will be appreciated that in accordance with the embodiments of the invention, the core can be manually manipulated into any desired shape and the brush, nozzle, etc. positioned in use by gripping or supporting the core remote from the brush or nozzle. In other words, the stiffness or self-supporting nature of the core allows the core to be used as the or part of a "handle" to firmly manipulate the brush and nozzle as required in use.

The dimensions of the connector are normally such that the connectors 15 and 16 can be fitted together to form a fluid-tight joint. The outer surface of the connector 15 is preferably slightly tapered and the inner surface of the connector 16 is also preferably slightly tapered to facilitate making suitable connections between them. In any event, two or more cores can be connected together end to end if required.

Figure 3:
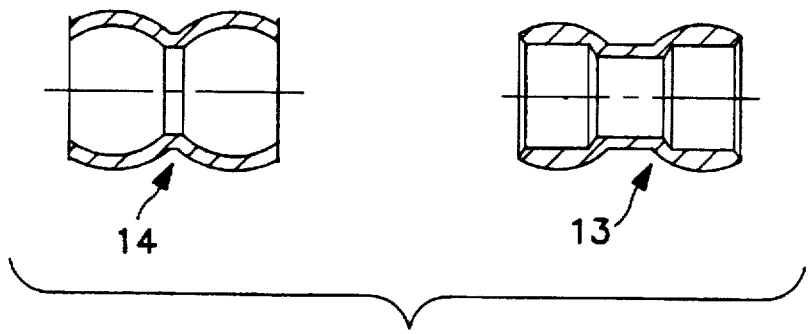
FIG. 3 shows separate cross-sectional views of first and second members with typical dimension shown on the Figure.

In FIG. 3, the members 13 and 14 are shown. In the preferred or typical dimensions for the core the minimum inner diameter of the passage 11 (of FIG. 1) is 17.3 mm. The maximum outer diameter of the passage is 31.7 mm so that the internal diameter is greater than 50%. In terms of a flexible core for use with a vacuum cleaner especially, typically 450 mm long, for example, this represents a significant improvement for equivalent cores made up of separate members, according to prior art arrangements. Also, the members 13 and 14 are required to provide fluid-tight self-supporting ball and socket joints, and yet in embodiments of the invention there are generally smooth dimensional transitions along the passage 11. As such, there is a generally smooth channel for air and dust, and if necessary water particles, and no significant pockets or crevices where or from where blockages may develop. Embodiments of the invention therefore provide self-supporting fluid tight cores that can be readily moulded in separate member components which are made up to any desired length. The cores have relatively generously dimensioned inner passages that allow comparatively unhindered fluid flow along the cores.

Suitable plastics materials for forming the moulded members 13, 14, 15 and 16 include polyacetal, polyoxymethylene and polyformaldehyde.

I claim:

1. A flexible self-supporting plastic vacuum cleaner core comprising: a plurality of first and second members resiliently inter-engaged alternatively end to end along a length of the core to form universally rotatable fluid tight joints between adjacent members, the first members each including a uniform cross-sectioned central cylindrical tubular member having first and second ends, each of the first and second ends being integrally formed with a first connection member having a part spherical male outer surface, the central cylindrical tubular member having a smaller outer diameter than the outer diameter of the part spherical outer member, and the second members each including a uniform cross-sectioned central cylindrical tubular member having a constant wall thickness and first and second ends, each of the first and second ends being integrally formed with a second connection member having a part spherical female inner surface, the central cylindrical tubular member having a smaller outer diameter than the outer diameter of the part spherical outer member, the first and second members being snap-fit together with the first connection members engaged inside respective second connection members to form the fluid tight joints.

2. The flexible self-supporting plastic vacuum cleaner core of claim 1 wherein a minimum internal diameter of the tubular members of the first and second members are substantially the same.

3. The flexible self-supporting plastic vacuum core of claim 2, including a passage having a minimum internal diameter that is at least greater than 50% of a maximum external diameter of the passage.

4. The flexible self-supporting plastic vacuum cleaner of claim 1, including a flexible hose surrounding and extending along the length of the core.

5. The flexible self-supporting plastic vacuum cleaner core of claim 1 having a connector including a uniform cylindrical tube integrally formed at one end of the core with a female member, the female member being snap-fit to a male member of one of the first members to form a fluid tight joint.

6. The flexible self-supporting plastic vacuum cleaner core of claim 5, wherein a diameter of the uniform cylindrical tube is tapered adjacent a remote end away from the female member.

7. The flexible self-supporting plastic vacuum cleaner core of claim 5, in which the connector includes a male member disposed on the other end of the core, the male member being arranged to fit in a female connector provided on a vacuum cleaner.

8. The flexible self-supporting plastic vacuum cleaner core of claim 5, in which the connector includes a female member disposed on the other end of the core, the female member being arranged to fit with a male connector provided on a vacuum cleaner.

9. The flexible self-supporting plastic vacuum cleaner of claim 5, having a male connector at one end and female connector at the other end.

* * * * *

UNITED STATES PATENT AND TRADEMARK OFFICE
CERTIFICATE OF CORRECTION

PATENT NO. : 5,778,939
DATED : July 14, 1998
INVENTOR(S) : Timmy Sin Hok-Yin

It is certified that error appears in the above-identified patent and that said Letters Patent is hereby corrected as shown below:

Column 4, Line 24, after "vacuum" insert --cleaner--;

Line 28, after "cleaner" insert --core--;

Line 51, after "cleaner" insert --core--.

Signed and Sealed this

Tenth Day of November 1998

Attest:

BRUCE LEHMAN

Attesting Officer

Commissioner of Patents and Trademarks